(12) United States Patent
Sato

(10) Patent No.: US 6,229,571 B1
(45) Date of Patent: *May 8, 2001

(54) SCAN CONVERTER WITH INTERPOLATING FUNCTION

(75) Inventor: Shinobu Sato, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/359,762

(22) Filed: Jul. 22, 1999

(30) Foreign Application Priority Data

Jul. 23, 1998 (JP) .................................................. 10-208259

(51) Int. Cl.$^7$ .............................. H04N 7/01; H04N 11/04
(52) U.S. Cl. ........................................... 348/446; 348/458
(58) Field of Search ................................... 348/441, 443, 348/445, 458, 459, 383, 564, 446, 448; H04N 11/04, 7/01

(56) References Cited

U.S. PATENT DOCUMENTS

| | | | |
|---|---|---|---|
| 5,166,801 | * 11/1992 | Yoshikawa | 348/383 |
| 5,376,973 | * 12/1994 | Katayama et al. | 348/714 |
| 5,404,170 | * 4/1995 | Keating | 348/443 |
| 5,646,697 | 7/1997 | Kurashige | 348/459 |
| 5,812,210 | * 9/1998 | Arai et al. | 348/555 |

FOREIGN PATENT DOCUMENTS

| | | |
|---|---|---|
| 6-105229 | 4/1994 | (JP) . |
| 7-212652 | 8/1995 | (JP) . |
| 7-225562 | 8/1995 | (JP) . |
| 10-098694 | 4/1998 | (JP) . |
| 10-126748 | 5/1998 | (JP) . |

* cited by examiner

Primary Examiner—Michael Lee
(74) Attorney, Agent, or Firm—Foley & Lardner

(57) ABSTRACT

The present invention relates to a scan converter with an interpolating function comprising: a plurality of frame buffers for dividing and storing video data of a first scan system and for reading the video data at a timing in accordance with a second scan system; and an interpolator for performing interpolation in the vertical direction for the video data read from the frame buffers.

6 Claims, 2 Drawing Sheets

SCAN CONVERTER WITH INTERPOLATING FUNCTION

BACKGROUND OF THE INVENTION

1. Field of the Invention

This invention relates to a scan converter with an interpolating function.

This application is based on Japanese Patent Application No. Hei 10-208259, the contents of which are incorporated herein by reference.

2. Background Art Including Information Disclosed Under 37 CFR 1.97 and 1.98

In general, scan converter circuits for converting the scan mode have become widely used, for example, to display a computer format video signal on a television monitor, or to record the computer format video signal on a video tape recorder. The scan system of the standard computer format video signal such as VGA or Super VGA (SVGA) differs from that of the general television signal such as NTSC (National Television System Committee) or PAL (Phase Alternation by line). Because these scan systems employ different scan frequencies, a frame buffer for temporarily storing video data is required to convert the scan mode.

Further, VGA and SVGA employ the non-interlaced scan (progressive scan) system while NTSC and PAL employ the interlaced scanning system. To avoid deterioration of the image quality after the conversion of the scan frequency, images must be interpolated. The interpolation requires a plurality of line buffers which can store data for one horizontal line.

Japanese Unexamined Patent Application, First Publication No. Hei 7-225562 discloses the scan converter using the frame buffer and the line buffers. Japanese Unexamined Patent Applications, First Publication Nos. Hei 6-105229, 7-212652, 10-098694, and 10-126748 also disclose the scan converter.

However, the above background technique using the frame buffer and the line buffers increases the scale of the circuitry. That is, the frame buffer and the line buffers must be semiconductor memories with large storage capacities because a video signal generally includes a large amount of data. The frame buffer and the line buffers with the large storage capacities increase the scale of the circuitry, the size of the device, and the costs.

SUMMARY OF THE INVENTION

It is therefore an object of the present invention to provide a scan converter with an interpolating function which reduces the scale of the circuitry.

In one aspect of the present invention, the scan converter with an interpolating function comprises: a plurality of frame buffers for dividing and storing video data of a first scan system and for reading the video data at a timing in accordance with a second scan system; and an interpolator for performing interpolation in the vertical direction for the video data read from the frame buffers.

In another aspect of the present invention, the scan converter with an interpolating function comprises: a high speed readable frame buffer for storing video data of a first scan system and for reading a plurality of pixel video data at a timing in accordance with a second scan system within a time to display one pixel; a plurality of temporary memories for temporarily storing the neighboring pixel video data read from the frame buffer; and an interpolator for performing interpolation in the vertical direction for the video data read from the frame buffers.

According to the present invention, the scan converter with the interpolating function can reduce the scale of the circuitry because it does not need a line buffer.

DETAILED DESCRIPTION OF THE PREFERRED EMBODIMENTS

The best mode of the scan converter with the interpolating function, according to an embodiment of the present invention, will be explained.

[First Embodiment]

The first embodiment of the present invention will be explained with reference to FIGS. 1 and 2.

Figure 1:
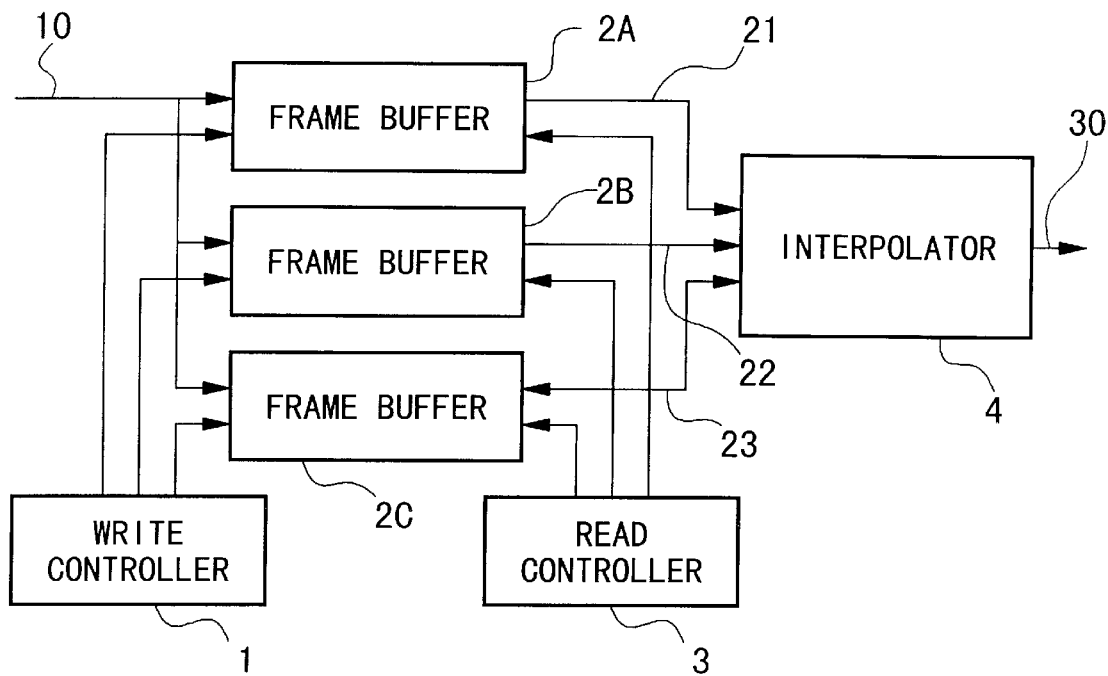
FIG. 1 is a block diagram showing the first embodiment of the scan converter with an interpolating function according to the present invention.

FIG. 1 is a block diagram showing the construction of the first embodiment. Reference numeral 1 denotes a write controller, reference numerals 2A to 2C denote frame buffers, reference numeral 3 denotes a read controller, and reference numeral 4 denotes an interpolator. The write controller 1 controls a process to write a video data 10 to the frame buffers 2A to 2C. The video data 10 is a computer format video signal (digital signal), such as a VGA or SVGA signal, in the non-interlaced scan system.

Each frame buffer 2A to 2C has a memory capacity sufficicnet to store ⅓ of the image undergoing the scan conversion process, and stores the video data 10. The read controller 3 controls a process to read the video data 21 to 23 from the frame buffers 2A to 2C, and reads the video data 21 to 23 at the timing of an NTSC signal, a PAL signal, or a television signal.

The interpolator 4 interpolates the video data 21 to 23 read by the read controller 3, and outputs converted data 30 with a scan frequency in an interlaced mode according to the NTSC or PAL signal format.

Figure 2:
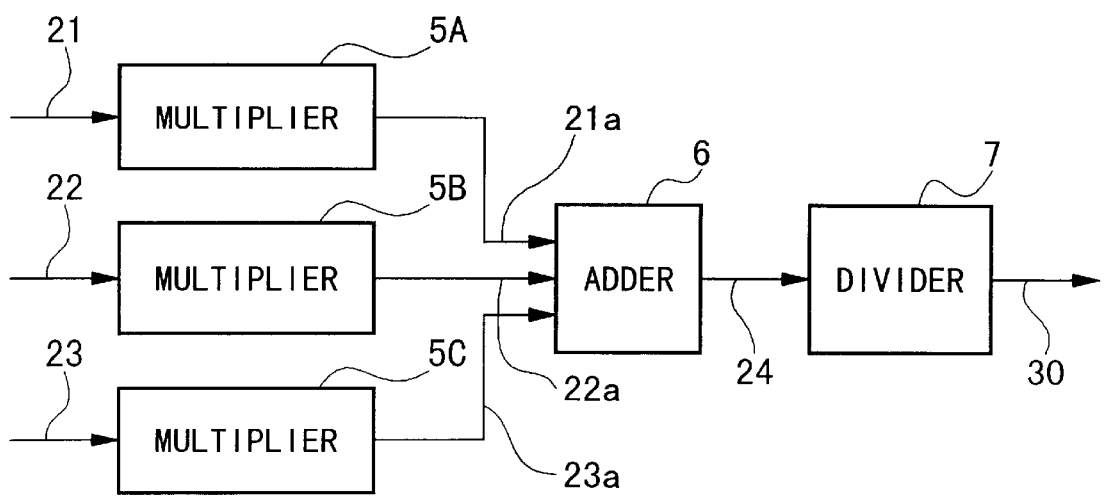
FIG. 2 is a block diagram showing in detail the structure of an interpolator in the first embodiment of the present invention.

FIG. 2 is a block diagram showing the structure of the interpolator 4 in detail. The interpolator 4 comprises multipliers 5A to 5C, an adder 6, and a divider 7.

The video data 21 to 23 are neighboring each other in the vertical direction. The multipliers 5A to 5C increase the video data 21 to 23 by a factor of two or outputs the data as they are, to produce the video data 21a, 22a, and 23a. The adder 6 adds up the video data 21a to 23a to produce the video data 24. The divider 7 divides the video data 24 by, for example, 4, to produce converted video data 30. For example, the multiplier 5 simply comprises a one-bit left shifter and a selector, and the divider 7 also simply comprises a 2-bit right shifter.

The operation of the first embodiment will now be explained.

The write controller 1 writes one horizontal line of the video data 10 at a time at a scan timing for the personal computer video signal to the frame buffers 2A, 2B, and 2C. For instance, the first line, the fourth line, the seventh line, . . . , the (3n+1) line are written in the frame buffer 2A. The second line, the fifth line, the eighth line, . . . , the (3n+2) line are written in the frame buffer 2B. The third line, the sixth line, the ninth line, . . . , the 3n line are written in the frame buffer 2C. Here, n is a nonnegative integer.

On the other hand, the read controller 3 reads the video data 21 to 23 from the frame buffers 2A, 2B, and 2C at a scan timing for the NTSC or PAL signal. For example, when reading the M line of the video data, the data of the (M−1) line, the M line, and the (M+1) line are simultaneously read out. The simultaneity is achieved because the video data 21 to 23 are written in the different frame buffers 2A, 2B, and 2C by the write controller 1.

The video data 21 to 23 successive in the vertical direction are input to the interpolator 4. The interpolator 4 generates, based on the video data 21 to 23, the converted video data 30 through a predetermined processing.

Specifically, the interpolator 4 performs interpolation for one pixel based on two dots above and below the target pixel in the vertical direction. That is, from pixel data F(m) in the m line, pixel data F(m−1) in the (m−1) line, and pixel data F(m+1) in the (m+1) line, the interpolated video data F'(m) is obtained by a weighting of 1:2:1, from the equation:

$$F'(m)=\{F(m-1)+2F(m)+F(m+1)\}/4$$

The multipliers 5A to 5C can select a 1x mode or an 2x mode. The video data 21 to 23 are the data of the (m−1) line, the m line, and the (m+1) line. By switching only the multiplier for the data of the m line (for example, the multiplier 5B) to the x2 mode while switching the other multipliers 5A and 5C to the x1 mode, the above weighting is obtained.

The weighted outputs 21a, 21b, and 21c from the multipliers 5A to 5C are added up by the adder 6, and the output from the adder 6 is divided by 4 by the divider 7. Thus, the interpolated video data F'(m) can be obtained.

In the first embodiment, the scan converter having an interpolating function can be constructed without a line buffer and without increasing the capacities of the frame buffers, reducing the scale of the circuity.

[Second Embodiment]

Figure 3:
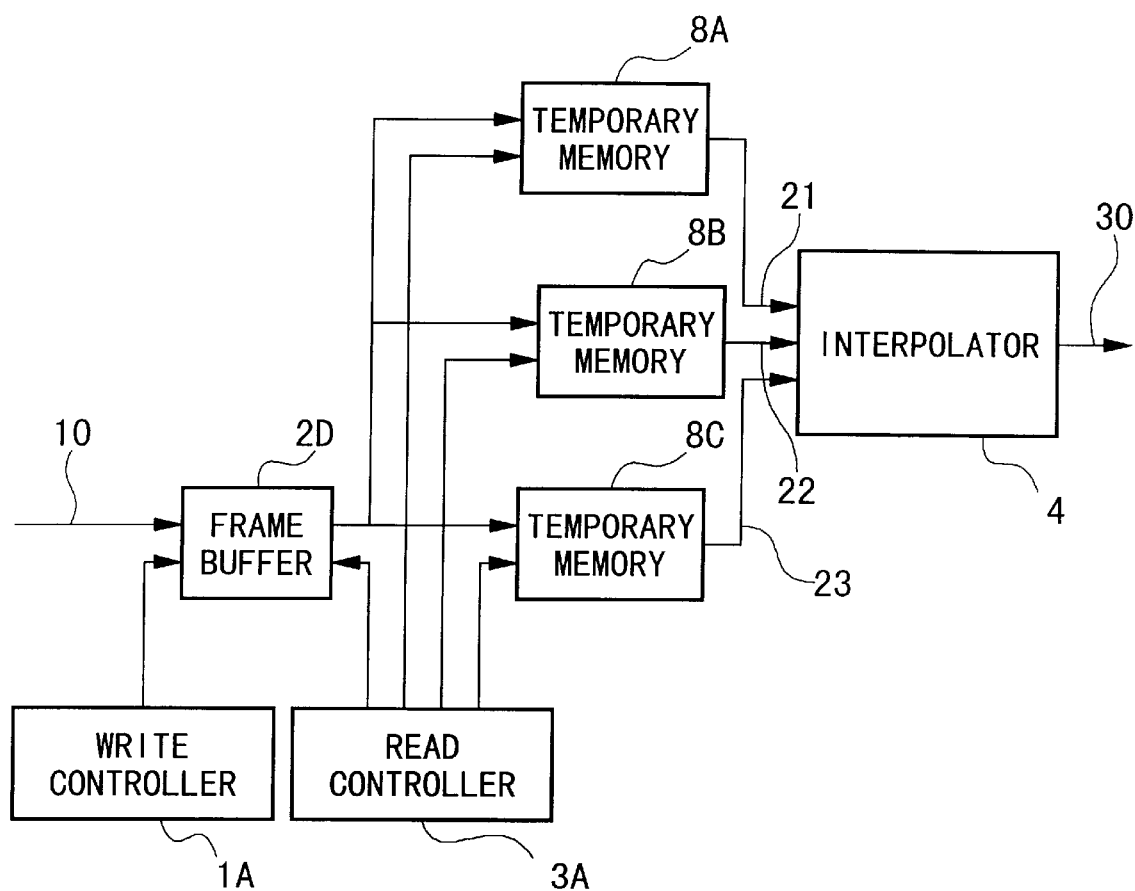
FIG. 3 is a block diagram showing the second embodiment of the scan converter with an interpolating function according to the present invention.

Next, the second embodiment of the present invention will be explained with reference to FIG. 3. In FIG. 3, reference numerals which are identical to those of FIG. 1 indicate elements which are identical to those of the first embodiment, therefore, explanations thereof will be omitted.

As shown in FIG. 3, instead of the frame buffers 2A to 2C, the second embodiment has one frame buffer 2D and three temporary memories 8A to 8C. The frame buffer 2D is a high speed memory which can perform more than three read operations within one pixel time for a TV signal (a time required to display one pixel). The frame buffer 2D has a storage capacity sufficient to store data for one image. The write controller 1A writes the video data 10 to a frame buffer 2D at the timing for a computer format video signal. The read controller 3A reads the video data from the frame buffer 2D at a timing for a TV signal.

When reading pixel data at the coordinates (X, Y) on the image from the frame buffer 2D, the read controller 3A also reads data of the two neighboring points (X, Y−1) and (X, Y+1), and stores the data in the temporary memories 8A to 8C each of which can store data for one pixel. The frame buffer 2D is a high speed memory, and reads the data of the three pixels within one pixel time.

The video data 21 to 23 stored in the temporary memories 8A to 8C is simultaneously read and are input to the interpolator 4, which produces the converted video data 30. The second embodiment requires only one frame buffer, thereby reducing the number of parts and the cost.

According to the present invention, the scan converter with the interpolating function can reduce the scale of the circuitry because it does not need a line buffer.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A scan converter with an interpolating function comprising:

a) first, second and third frame buffers for storing video data, and each having a memory capacity sufficient to store ⅓ of an image undergoing a scan conversion process;

b) a write controller for writing said video data of scan lines neighboring each other in the vertical direction on said image into said first, second and third frame buffers at a scan timing in accordance with a first scan system that employs a non-interlaced scan mode;

c) a read controller for reading said video data stored in said first, second and third frame buffers at a scan timing different from the scan timing of said first scan system in accordance with a second scan system that employs an interlaced scan mode; and d) an interpolator for performing interpolation in the vertical direction for the video data read from said first, second and third frame buffers.

2. A scan converter according to claim 1, wherein said interpolator interpolates the video data output from said first, second and third frame buffers by a weighting of 1:2:1.

3. A method for conversion of a scan mode comprising the steps of:

dividing and storing video data of scan lines neighboring each other in the vertical direction on an image undergoing a scan conversion process at a first timing in accordance with a first scan system that employs a non-interlaced scan mode into first, second and third frame buffers each having a memory capacity sufficient to store ⅓ of said image;

reading said video data at a second timing different from said first timing in accordance with a second scan system that employs an interlaced scan mode from said first, second and third frame buffers; and performing interpolation in the vertical direction for the video data read from said first, second and third frame buffers.

4. A method according to claim 3, wherein said video data read from said first, second and third frame buffers is interpolated by a weighting of 1:2:1.

5. A computer-readable memory containing computer-readable instructions to convert a scan mode, comprising the process of:

dividing and storing video data of scan lines neighboring each other in the vertical direction on an image undergoing a scan conversion process at a first timing in accordance with a first scan system that employs a non-interlaced scan mode into first, second and third frame buffers and reading each having a memory capacity sufficient to store ⅓ of said image;

reading said video data at a second timing different from said first timing in accordance with a second scan system that employs an interlaced scan mode from said, second and third frame buffers; and performing interpolation in the vertical direction for the video data read from said first, second and third frame buffers.

6. A computer-readable memory according to claim 5, wherein said video data read from said first, second and third frame buffers is interpolated by a weighting of 1:2:1.

* * * * *